(12) United States Patent
Lin et al.

(10) Patent No.: US 10,645,768 B2
(45) Date of Patent: *May 5, 2020

(54) LIGHT APPARATUS WITH ENLIGHTENED PATTERN

(71) Applicant: XIAMEN ECO LIGHTING CO. LTD., Xiamen (CN)

(72) Inventors: Xianghua Lin, Xiamen (CN); Liangliang Cao, Xiamen (CN); Yi Yang, Xiamen (CN); Hongkui Jiang, Xiamen (CN); Yanzeng Gao, Xiamen (CN)

(73) Assignee: XIAMEN ECO LIGHTING CO. LTD., Xiamen (CN)

(*) Notice: Subject to any disclaimer, the term of this patent is extended or adjusted under 35 U.S.C. 154(b) by 27 days.

This patent is subject to a terminal disclaimer.

(21) Appl. No.: 15/950,880

(22) Filed: Apr. 11, 2018

(65) Prior Publication Data
US 2019/0320509 A1 Oct. 17, 2019

(51) Int. Cl.
*F21V 17/04* (2006.01)
*H05B 33/08* (2020.01)
*F21V 8/00* (2006.01)

(52) U.S. Cl.
CPC ......... *H05B 33/0842* (2013.01); *F21V 17/04* (2013.01); *G02B 6/0073* (2013.01)

(58) Field of Classification Search
None
See application file for complete search history.

(56) References Cited

U.S. PATENT DOCUMENTS

| | | | |
|---|---|---|---|
| 2011/0286200 A1* | 11/2011 | Iimura | F21V 7/041 362/84 |
| 2012/0069595 A1* | 3/2012 | Catalano | F21V 17/002 362/555 |
| 2015/0377461 A1* | 12/2015 | Hutchins | F21S 8/065 362/237 |
| 2016/0273716 A1* | 9/2016 | Tarsa | F21K 9/61 |
| 2018/0003348 A1* | 1/2018 | Pan | F21V 3/02 |
| 2018/0283620 A1* | 10/2018 | Cao | F21K 9/237 |
| 2018/0372276 A1* | 12/2018 | Su | F21K 9/232 |

\* cited by examiner

*Primary Examiner* — Ashok Patel
(74) *Attorney, Agent, or Firm* — Chun-Ming Shih; LanWay IPR Services

(57) ABSTRACT

A light apparatus with an enlightened pattern includes a driver circuit, a LED plate, an optical light guide, a connector and a bulb shell. The LED plate connected to the driver circuit has a LED module for emitting a light. The optical light guide has a bottom end facing to the LED module for receiving the light and has a top end forming an enlightened pattern where the light escaped from the top end of the optical light guide. The connector is used for fixing the LED plate to the optical light guide for aligning the LED module to emit the light into the bottom end and for transmitting heat of the LED plate to the optical light guide.

18 Claims, 9 Drawing Sheets

LIGHT APPARATUS WITH ENLIGHTENED PATTERN

TECHNICAL FIELD

The present invention is related to a light apparatus and more particularly related to a light apparatus with an enlightened pattern.

BACKGROUND

From the time Edison invented the first Tungsten filament light bulb, light devices are quickly wide spread in human life. In recent years, due to semiconductor technology development, LED technologies bring a new page of the luminous industry.

Even so, people still want more features to be provided by luminous devices, though it has been a crowded art. While so many light devices are used in the world, any minor advancement may bring tremendous effect in human life.

Today, not only luminous efficacy is an important goal to seek, decoration purposes are also important. Sometime, designers want to use the most advanced LED technology to replace traditional beautiful Tungsten bulb but it seems there is much to do with a low cost solution.

Therefore, it would bring great benefit, if a decorative light effect may be achieved while cost factor is still considered.

SUMMARY OF INVENTION

According to an embodiment of the present invention, a light apparatus has a driver circuit, a LED plate, an optical light guide, a connector and a bulb shell. In an example, the light apparatus is a light bulb with a cap for storing the driver circuit and for installing into a standard Edison socket.

The driver circuit converts an external power source to a driving current. The LED plate is connected to the driver circuit and has a first LED module for emitting a first light with the driving current. Please be noted that the term 'plate' does not need to a flat board with a surface. For example, a surrounding belt for mounting a plurality of LED modules may also be regarded as a 'LED plate' mentioned in this application. The 'plate' does not need to be limited to one board. Multiple units may be referred as a 'plate' in this application, too.

The optical light guide has a bottom end facing to the first LED module for receiving the first light and has a top end forming an enlightened pattern where the first light escaped from the top end of the optical light guide. For example, the optical light guide is transparent like using transparent PMMA material or PC material and the top end forms a curved edge for light to escape and to form the enlightened pattern, e.g. a Tungsten filament.

The connector is used for fixing the LED plate to the optical light guide for aligning the first LED module to emit the first light into the bottom end and for transmitting heat of the LED plate to the optical light guide. The connector may be a ring with screw structures so as to match to the bulb shell, the optical light guide and the LED plate. The connector may be a part of a cap of a light bulb. The connector may be a part of the bulb shell. The connector may be any part for directly or indirectly connecting the optical light guide and the LED plate.

The bulb shell covers the optical light guide. The surface of the bulb shell may be mixed or coated with certain material for optimizing light output effect.

In some embodiments, the optical light guide is a tube structure.

Furthermore, in some embodiments, the top end of the tube structure has a plurality of protruding structures, a surface of the plurality of protruding structures forming the enlightened pattern.

In some embodiments, the LED plate further has a second LED module not directly emitting a second light into the optical light guide for emitting the second light as a luminous source.

In some other embodiments, the optical light guide is a plate with two fork patterns extended from the bottom end of the optical light guide to the top end of the optical light guide and the enlightened pattern appears like a Tungsten filament supported by the two fork patterns to simulate a Tungsten light bulb.

Furthermore, the two fork patterns may be made by coloring paints on the optical guide. The two fork patterns may be made by placing two metal strips. In such design, when the LED module emits the first light into the optical light guide, the enlightened pattern seems like a Tungsten filament supported by two metal strips, which provides a vivid replacement of traditional Tungsten filament bulb and particularly helpful for designing attractive light devices.

In some embodiments, the optical light guide is composed of multiple components to form a three-dimensional extended structure. For example, two or more units of plastic units may be made separately and assembled to form a three-dimension structure expanding in the bulb shell to provide a complicated three-dimension enlightened pattern.

In some embodiments, a lateral side of the optical light guide has grooves providing a part of the first light to escape. In other words, not only the top end of the optical light guide may provide enlightened pattern, the lateral side of the optical light guide may provide one or more other enlightened patterns, too.

In some embodiments, the groove near the top end of the optical light guide has different dimension as the groove near the bottom end so as to make escaped light strengths similar to each other. As the first light passing in the optical light guide, its strength gets weaker and weaker. Therefore, to make enlightened patterns more evenly, the groove near the bottom end of the optical light guide may have different processing, e.g. escaping less ratio of light, as the groove near the top end of the optical light guide.

In some embodiments, the optical light guide is made of Polymethyl Methacrylate (PMMA) material and the top end of the optical light guide is made by polished cutting. In other words, the polished cutting may be applied on surface of the optical light guide to form grooves, lens, or other optical structures for light to escape in different manners.

In some embodiments, the optical light guide is mixed with a coloring material for depressing a part of predetermined spectrum to adjust the color of the enlightened pattern. Its principle is like sun glasses. By using certain coloring into a transparent plastic material, certain parts of frequency may be depressed or blocked to change output color and output light characteristic.

In some embodiments, a fluorescent layer is applied on the optical light guide to change spectrum composition of the enlightened pattern. As known in the art of LED technologies, by applying suitable fluorescent layer for LED light to pass through, the LED light may be converted to another spectrum, e.g. from blue LED light to red or green light by using different fluorescent material. The fluorescent material may be mixed or applied in different places of the optical light guide. For example, the fluorescent material may be applied on the bottom end, the top end, or middle part of the optical light guide for adjusting output light and enlightened pattern characteristic.

In some embodiments, the optical light guide comprises multiple components having bending parts to form a three-dimension structure. For example, the optical light guide may have two arms extending from the LED plate and the arms are bent for an angle near the top end of the arm. In such arrangement, when the enlightened pattern is at the top end of the optical light guide, the enlightened pattern is an extended three-dimension shape with a size larger than the bottom distance of the two arms. Three or more components may be adjusted to design various combination and variations of enlightened patterns.

In some embodiments, the LED plate has a second LED module for not directly emitting a second light into the optical light guide and for emitting the second light as a luminous source.

Furthermore, the second LED module and the first LED module are controlled by the driver circuit independently to provide multiple operation combination of the first LED module and the second LED module. For example, in the night bed time, the second LED module is turned while the first LED module is turned on to provide a night light. In other time, the first LED and the second LED may be both turned on to provide a stronger luminous effect.

In addition to having only one enlightened pattern, in some embodiments, a third LED module may be provided and may be operated independently from the first LED module. In other words, users may change different enlightened patterns in the same light bulb. More interesting applications maybe be derived based on this spirit and direction.

In some embodiments, the bottom end of the optical light guide has concave lens for distributing the first light evenly into the optical light guide.

Alternatively, in some other embodiments, the bottom end of the optical light guide has a convex lens for condensing the first light as a light beam into the optical light guide. The two different approaches may be used in different light device requirements.

In some embodiments, the optical light guide is made of Polycarbonate (PC) material and the enlightened pattern is formed with a laser light.

In some embodiments, the bulb shell has a thickness and the LED module emits a part of light transmitted in the bulb shell forming a second enlightened pattern.

DETAILED DESCRIPTION

Figure 1:
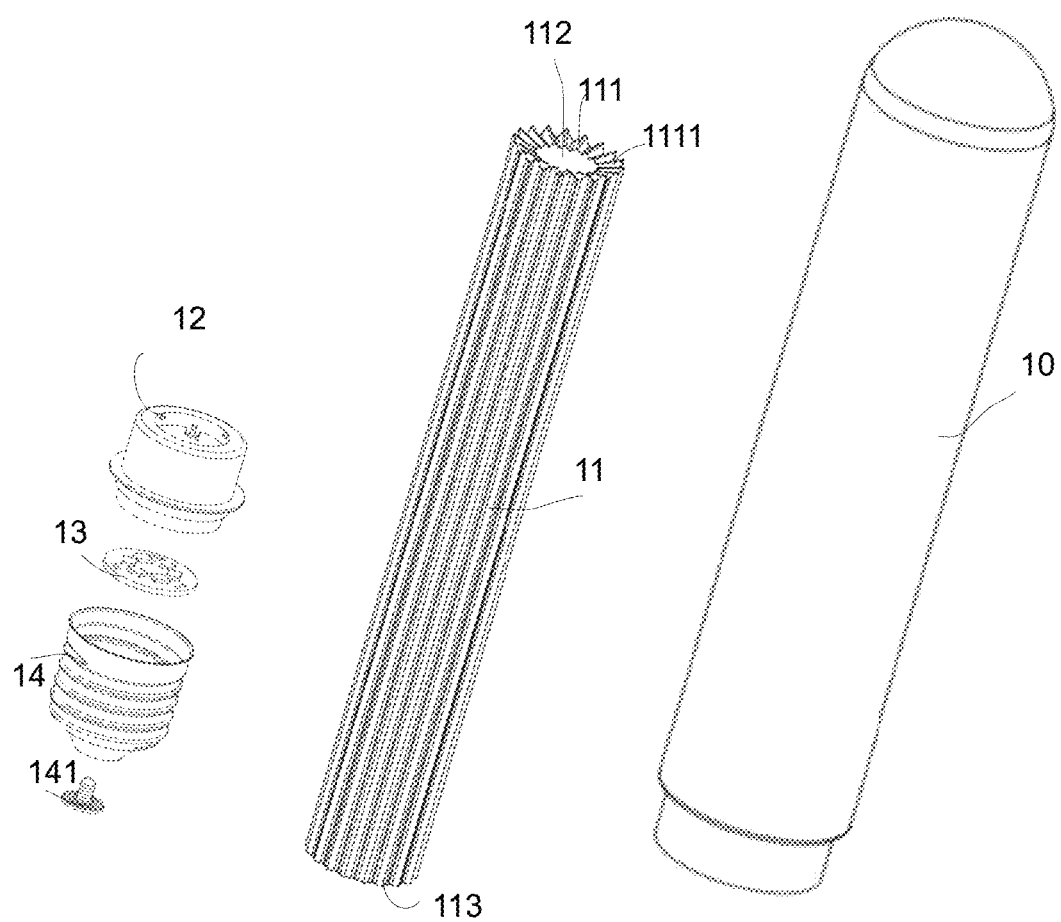
FIG. 1 is an exploded diagram of component in a light apparatus embodiment.
Figure 2:
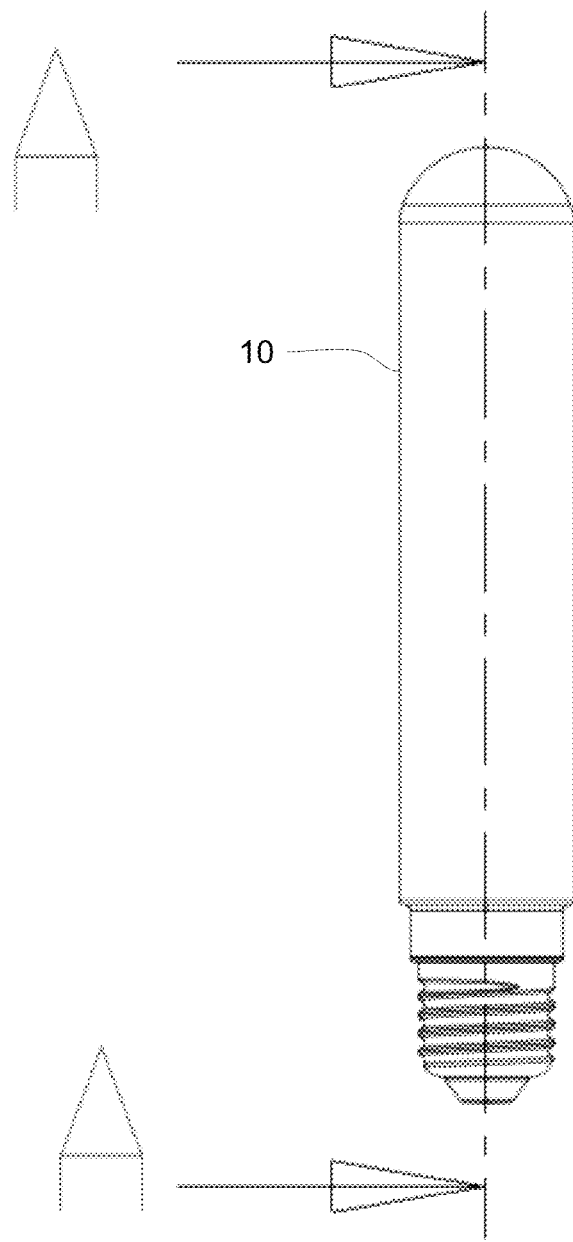
FIG. 2 is a side view of the embodiment in FIG. 1.
Figure 3:
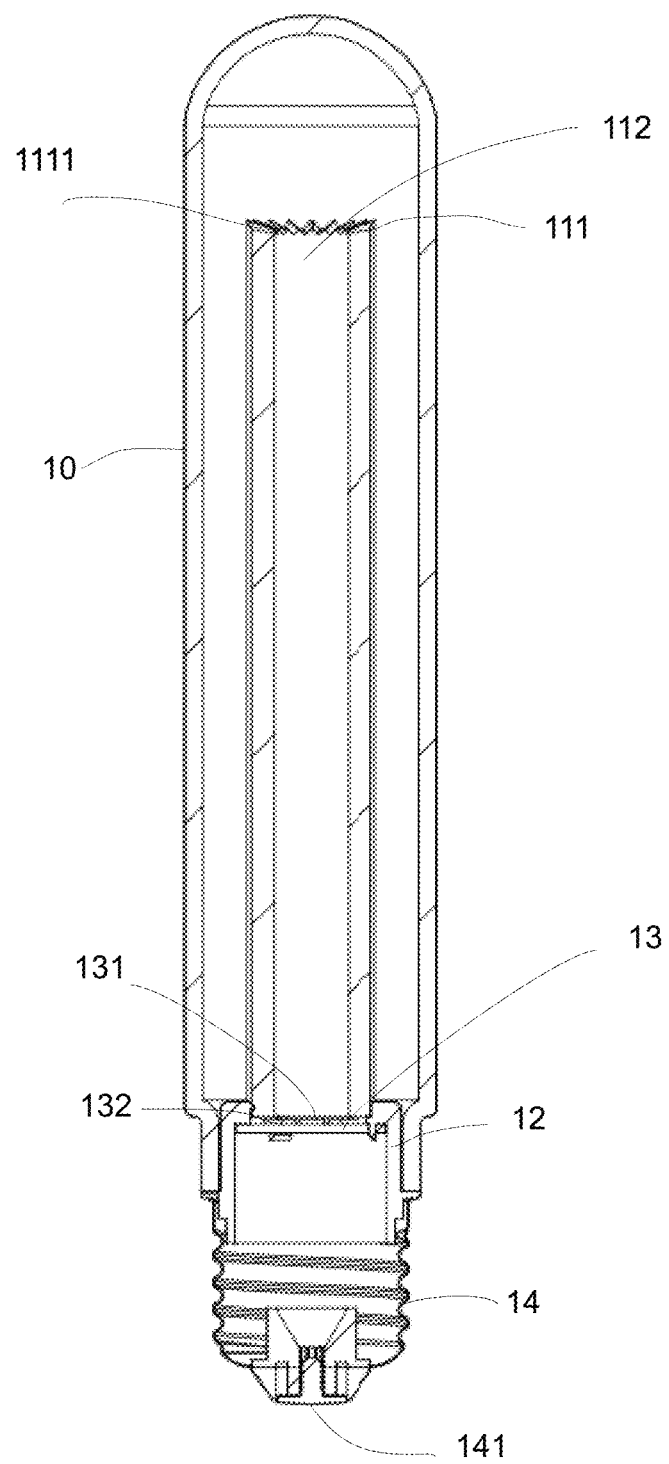
FIG. 3 is cross-sectional view of the embodiment in FIG. 2.

Please refer to FIG. 1, FIG. 2 and FIG. 3. FIG. 1 is an exploded diagram of component in a light apparatus embodiment. FIG. 2 is a side view of the embodiment in FIG. 1. FIG. 3 is cross-sectional view of the embodiment in FIG. 2. The same reference numerals in FIG. 1, FIG. 2 and FIG. 3 refer to the same component.

In the embodiment of FIG. 1, FIG. 2 and FIG. 3, the light apparatus includes a bulb shell 10, an optical light guide 11, a connector 12, a LED plate 13, a cap 14 and a cap terminal 141. The cap 14 and the cap terminal 141 provides two electrodes connecting to a traditional Edison socket for receiving external power of 110V or 220V.

A driver circuit (not shown) contains circuits for converting the external power to a driving current supplying the LED modules mounted on the LED plate 13 to emit light. Some LED modules emit a first light into the optical light guide. The first light firstly enters the bottom end 113 of the optical light guide 11, then travels in the optical light guide 11 and then escapes from the top end 111 to form an enlightened pattern. In this example, the top end 111 of the optical light guide 11 has multiple protruding structures 111 and the enlightened pattern is a beautiful crown shape.

In this example, as illustrated in FIG. 3, the optical light guide is a tube with a hollow spacing i112 n the middle of the tube. Some LED modules 131 on the LED plate 13 do not emit light directly into the optical light guide 11 and emits light as a luminous source. In other words, some LED modules 132 are used for creating the enlightened pattern while some other LED modules 131 may be used for providing luminous effect.

FIG. 2 shows a cross-sectional points A-A and FIG. 3 shows the associated cross-sectional view of this embodiment.

Figure 4:
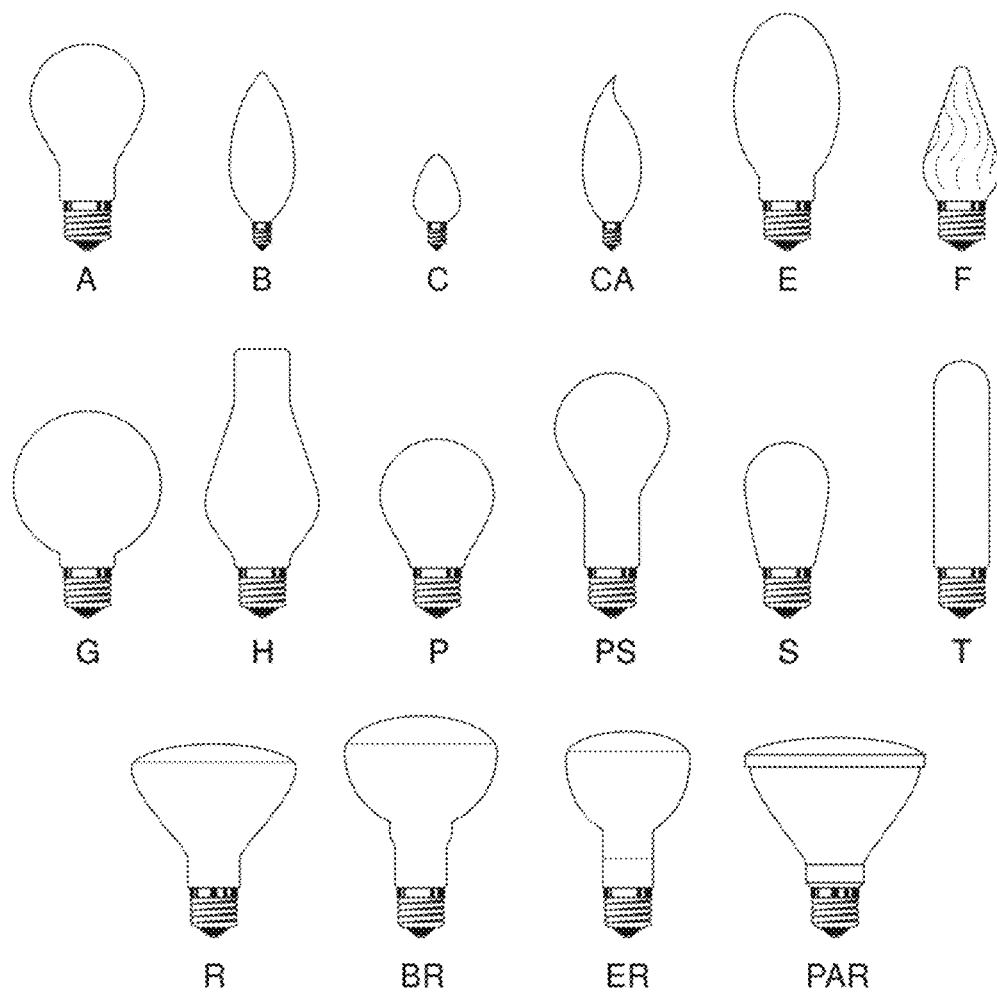
FIG. 4 illustrate examples of multiple bulb shells types that may be used to implement the invention.

FIG. 4 illustrate examples of multiple bulb shells types that may be used to implement the invention. In addition to the bulb shell type in FIG. 1, FIG. 2 and FIG. 3, various bulb shells as illustrated in FIG. 4 may be used in the present invention. One or two alphabet letters commonly used in the art are attached below each of the bulb shell images.

In other words, there are various ways to combine the optical light guide mentioned above in addition to the illustrated type T in FIG. 1, FIG. 2 and FIG. 3.

Figure 5:
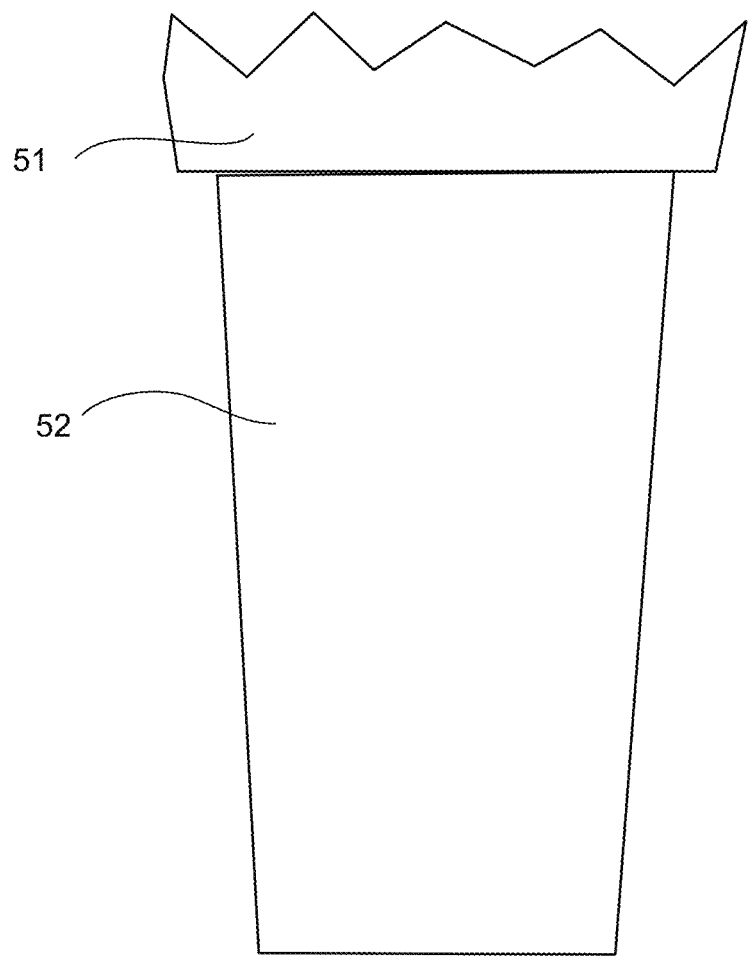
FIG. 5 illustrates an optical light guide example.

FIG. 5 illustrates an optical light guide example. In FIG. 5, the optical light guide 52 has a narrower bottom and wider top portion. In addition the optical light guide in this example are made of two units 51, 52 assembled together. With such design, when a manufacturers want to change enlightened pattern, the top unit 51 may be replaced while keeping the same bottom unit 52 unchanged. This saves certain stocking cost and molding cost and increases flexibility of design at the same time.

Figure 6:
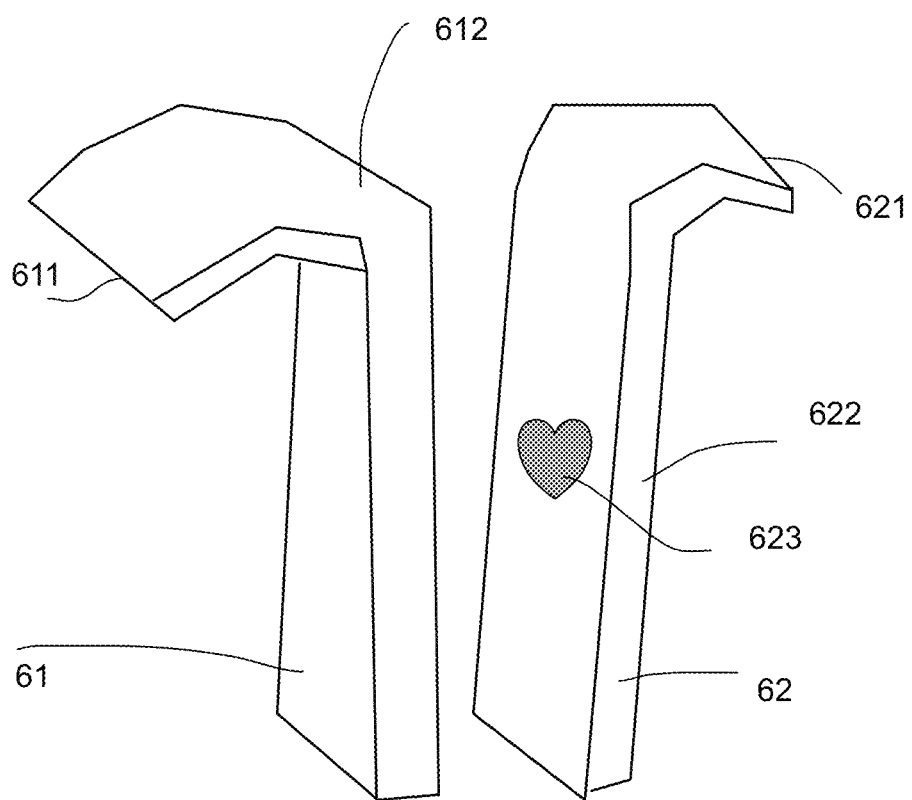
FIG. 6 illustrates another optical light guide example.

FIG. 6 illustrates another optical light guide example. In FIG. 6, the optical light guide has two arms 61, 62. The two arms are bent at a portion 612 to enlarge the expanded range of the top portion of the arms 61, 62. The enlightened pattern may be designed at the top edge 611, 621, or the lateral edge 622. In addition, certain pattern 623 may be formed like cutting grooves for light to escape on the lateral side of the optical light guide.

Figure 7:
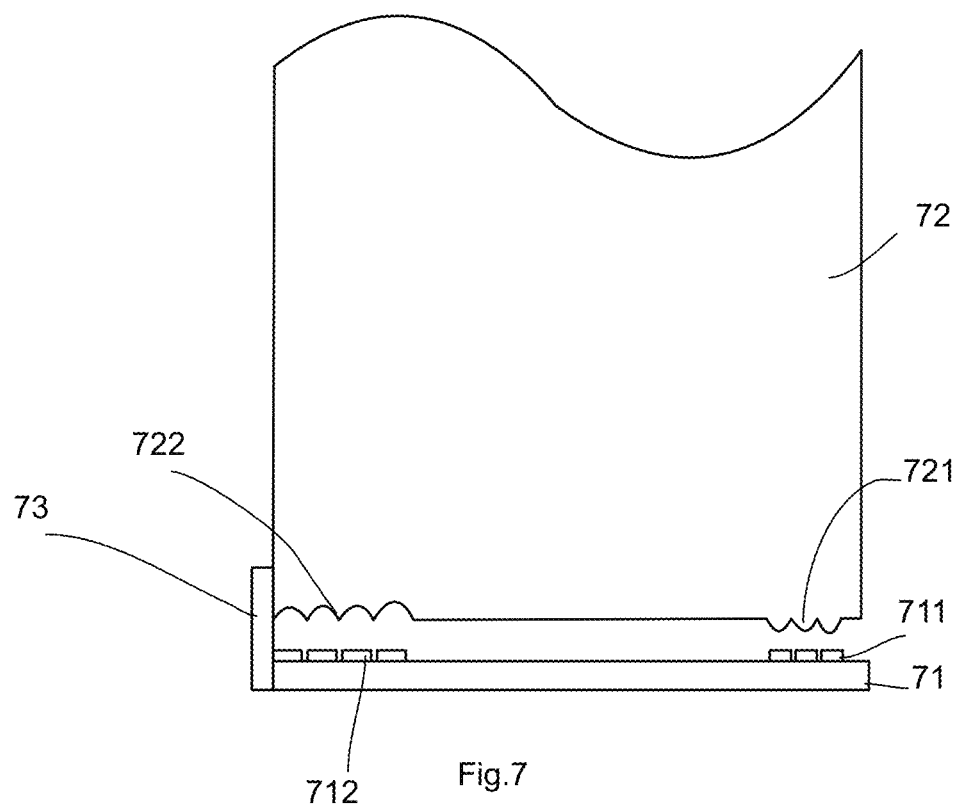
FIG. 7 illustrates relation of LED modules and optical light guide parts.

FIG. 7 illustrates relation of LED modules and optical light guide parts. In FIG. 7, the optical light guide 72 has a portion of bottom end forming concave lens 722 for distributing light from the LED module 712 more evenly in the optical light guide 72. In this illustrated example, the optical light guide 72 has another portion of bottom end forming convex lens 721 for converging light emitting from the LED modules 711 on the LED plate 71.

One or multiple types of lens may be applied on the optical light guide to achieve different design goals and requirements.

In addition, the LED plate 71 may be integrated and aligned with the optical light guide 72 with a connector 73. The connector 73 engages with both the optical light guide 72 and the LED plate 71. Since the LED plate 71 is a major heat source, the connector 73, in addition to fix and align the LED plate 71 to the optical light guide 72, heat of the LED plate 71 may be also transmitted to the optical light guide 72 to provide heat dissipation. The connector 73 may be made of metal ring or plastic material for heat dissipation.

Figure 8:
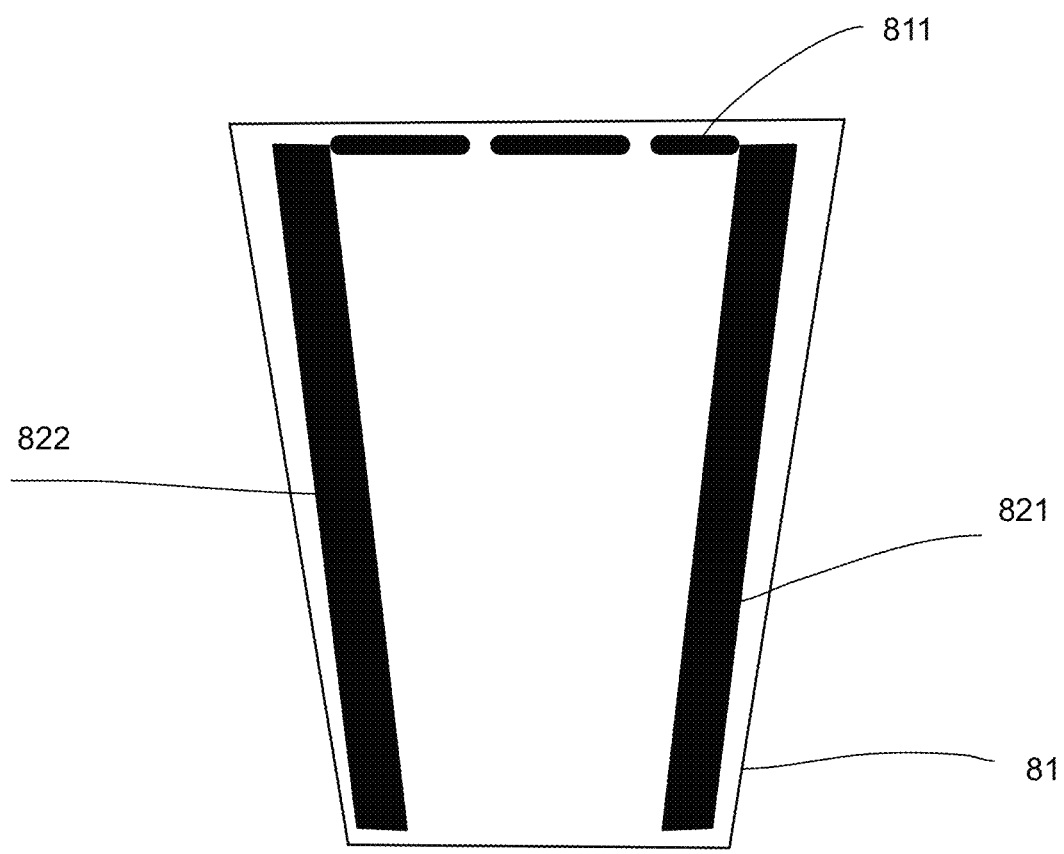
FIG. 8 illustrates another way to simulate a Tungsten light bulb.

FIG. 8 illustrates another way to simulate a Tungsten light bulb. In FIG. 8, two fork patterns 821, 822 are made on the optical light guide 81 by placing two metal strips to simulate a traditional Tungsten filament bulb. In the example of FIG. 8, the enlightened pattern 811 is designed to show between the top ends of the two metal strips. When the light apparatus is turned on, it is just looking like a traditional Tungsten filament bulb, which is very useful on designing certain decorative light devices while keeping advantage of LED technologies.

Figure 9:
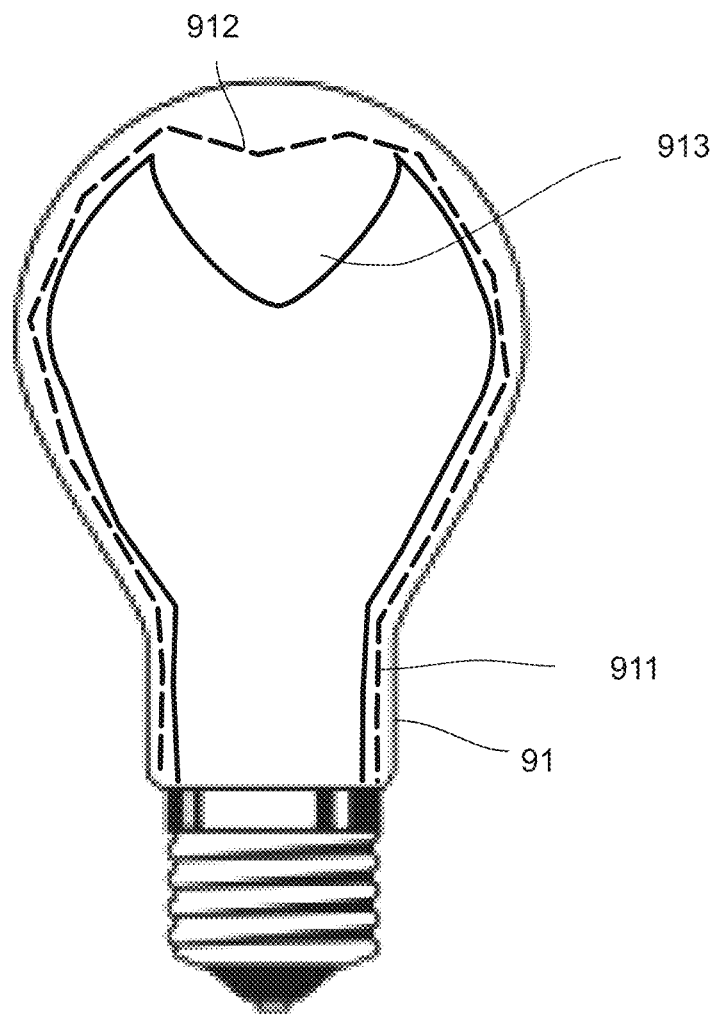
FIG. 9 illustrates another embodiment of the present invention.

FIG. 9 illustrates another embodiment of the present invention. In FIG. 9, the bulb shell 91 has certain thickness and part of light 911 is transmitted into the bulb shell. In addition, the bulb shell 91 has a thicker part 913 at the top of the bulb shell 91. Certain enlightened pattern like Tungsten filament or other geometric shapes 912 may be formed to enrich design possibility of the present invention.

Based on the spirit of FIG. 9, the optical light guide may be integrated with the bulb shell. In some embodiments, the optical light guide may replace the bulb shell. In other words, the optical light guide may be made as a bulb shell and part of LED light is guided into the optical light guide. Furthermore, heat dissipation gas like He, H2 may be filled in the sealed chamber of the bulb shell, in this case the optical light guide, within 100 to 2000 Torr.

According to an embodiment of the present invention, a light apparatus has a driver circuit, a LED plate, an optical light guide, a connector and a bulb shell. In an example, the light apparatus is a light bulb with a cap for storing the driver circuit and for installing into a standard Edison socket.

The driver circuit converts an external power source to a driving current. The LED plate is connected to the driver circuit and has a first LED module for emitting a first light with the driving current. Please be noted that the term 'plate' does not need to a flat board with a surface. For example, a surrounding belt for mounting a plurality of LED modules may also be regarded as a 'LED plate' mentioned in this application. The 'plate' does not need to be limited to one board. Multiple units may be referred as a 'plate' in this application, too.

The optical light guide has a bottom end facing to the first LED module for receiving the first light and has a top end forming an enlightened pattern where the first light escaped from the top end of the optical light guide. For example, the optical light guide is transparent like using transparent PMMA material or PC material and the top end forms a curved edge for light to escape and to form the enlightened pattern, e.g. a Tungsten filament.

The connector is used for fixing the LED plate to the optical light guide for aligning the first LED module to emit the first light into the bottom end and for transmitting heat of the LED plate to the optical light guide. The connector may be a ring with screw structures so as to match to the bulb shell, the optical light guide and the LED plate. The connector may be a part of a cap of a light bulb. The connector may be a part of the bulb shell. The connector may be any part for directly or indirectly connecting the optical light guide and the LED plate.

The bulb shell covers the optical light guide. The surface of the bulb shell may be mixed or coated with certain material for optimizing light output effect.

In some embodiments, the optical light guide is a tube structure.

Furthermore, in some embodiments, the top end of the tube structure has a plurality of protruding structures, a surface of the plurality of protruding structures forming the enlightened pattern.

In some embodiments, the LED plate further has a second LED module not directly emitting a second light into the optical light guide for emitting the second light as a luminous source.

In some other embodiments, the optical light guide is a plate with two fork patterns extended from the bottom end of the optical light guide to the top end of the optical light guide and the enlightened pattern appears like a Tungsten filament supported by the two fork patterns to simulate a Tungsten light bulb.

Furthermore, the two fork patterns may be made by coloring paints on the optical guide. The two fork patterns may be made by placing two metal strips. In such design, when the LED module emits the first light into the optical light guide, the enlightened pattern seems like a Tungsten filament supported by two metal strips, which provides a vivid replacement of traditional Tungsten filament bulb and particularly helpful for designing attractive light devices.

In some embodiments, the optical light guide is composed of multiple components to form a three-dimensional extended structure. For example, two or more units of plastic units may be made separately and assembled to form a three-dimension structure expanding in the bulb shell to provide a complicated three-dimension enlightened pattern.

In some embodiments, a lateral side of the optical light guide has grooves providing a part of the first light to escape. In other words, not only the top end of the optical light guide may provide enlightened pattern, the lateral side of the optical light guide may provide one or more other enlightened patterns, too.

In some embodiments, the groove near the top end of the optical light guide has different dimension as the groove near the bottom end so as to make escaped light strengths similar to each other. As the first light passing in the optical light guide, its strength gets weaker and weaker. Therefore, to make enlightened patterns more evenly, the groove near the bottom end of the optical light guide may have different processing, e.g. escaping less ratio of light, as the groove near the top end of the optical light guide.

In some embodiments, the optical light guide is made of Polymethyl Methacrylate (PMMA) material and the top end of the optical light guide is made by polished cutting. In other words, the polished cutting may be applied on surface of the optical light guide to form grooves, lens, or other optical structures for light to escape in different manners.

In some embodiments, the optical light guide is mixed with a coloring material for depressing a part of predetermined spectrum to adjust the color of the enlightened pattern. Its principle is like sun glasses. By using certain coloring into a transparent plastic material, certain parts of frequency may be depressed or blocked to change output color and output light characteristic.

In some embodiments, a fluorescent layer is applied on the optical light guide to change spectrum composition of the enlightened pattern. As known in the art of LED technologies, by applying suitable fluorescent layer for LED light to pass through, the LED light may be converted to another spectrum, e.g. from blue LED light to red or green light by using different fluorescent material. The fluorescent material may be mixed or applied in different places of the optical light guide. For example, the fluorescent material may be applied on the bottom end, the top end, or middle part of the optical light guide for adjusting output light and enlightened pattern characteristic.

In some embodiments, the optical light guide comprises multiple components having bending parts to form a three-dimension structure. For example, the optical light guide may have two arms extending from the LED plate and the arms are bent for an angle near the top end of the arm. In such arrangement, when the enlightened pattern is at the top end of the optical light guide, the enlightened pattern is an extended three-dimension shape with a size larger than the bottom distance of the two arms. Three or more components may be adjusted to design various combination and variations of enlightened patterns.

In some embodiments, the LED plate has a second LED module for not directly emitting a second light into the optical light guide and for emitting the second light as a luminous source.

Furthermore, the second LED module and the first LED module are controlled by the driver circuit independently to provide multiple operation combination of the first LED module and the second LED module. For example, in the night bed time, the second LED module is turned while the first LED module is turned on to provide a night light. In other time, the first LED and the second LED may be both turned on to provide a stronger luminous effect.

In addition to having only one enlightened pattern, in some embodiments, a third LED module may be provided and may be operated independently from the first LED module. In other words, users may change different enlightened patterns in the same light bulb. More interesting applications maybe derived based on this spirit and direction.

In some embodiments, the bottom end of the optical light guide has concave lens for distributing the first light evenly into the optical light guide. Alternatively, in some other embodiments, the bottom end of the optical light guide has a convex lens for condensing the first light as a light beam into the optical light guide. The two different approaches may be used in different light device requirements.

In some embodiments, the optical light guide is made of Polycarbonate (PC) material and the enlightened pattern is formed with a laser light.

In some embodiments, the bulb shell has a thickness and the LED module emits a part of light transmitted in the bulb shell forming a second enlightened pattern.

In addition to the above-described embodiments, various modifications may be made, and as long as it is within the spirit of the same invention, the various designs that can be made by those skilled in the art are belong to the scope of the present invention.

The invention claimed is:

1. A light apparatus, comprising:
   a driver circuit for converting an external power source to a driving current;
   a LED plate being connected to the driver circuit and having a first LED module for emitting a first light with the driving current;
   an optical light guide having a bottom end facing to the first LED module for receiving the first light and having a top end forming an enlightened pattern where the first light escaped from the top end of the optical light guide, wherein the optical light guide comprises multiple components having bending parts to form a three-dimension structure;
   a connector for fixing the LED plate to the optical light guide for aligning the first LED module to emit the first light into the bottom end and for transmitting heat of the LED plate to the optical light guide; and
   a bulb shell covering the optical light guide.

2. The light apparatus of claim 1, wherein the optical light guide is a tube structure.

3. The light apparatus of claim 2, wherein the top end of the tube structure has a plurality of protruding structures, a surface of the plurality of protruding structures forming the enlightened pattern.

4. The light apparatus of claim 2, wherein the LED plate further has a second LED module not directly emitting a second light into the optical light guide for emitting the second light as a luminous source.

5. The light apparatus of claim 1, wherein the optical light guide is a plate with two fork patterns extended from the bottom end of the optical light guide to the top end of the optical light guide and the enlightened pattern appears like a Tungsten filament supported by the two fork patterns to simulate a Tungsten light bulb.

6. The light apparatus of claim 5, wherein the two fork patterns are made by placing two metal strips.

7. The light apparatus of claim 1, wherein the optical light guide is composed of multiple components to form a three-dimensional extended structure.

8. The light apparatus of claim 1, wherein a lateral side of the optical light guide has grooves providing a part of the first light to escape.

9. The light apparatus of claim 8, wherein the groove near the top end of the optical light guide has different dimension as the groove near the bottom end so as to make escaped light strengths similar to each other.

10. The light apparatus of claim 1, wherein the optical light guide is made of Polymethyl Methacrylate (PMMA) material and the top end of the optical light guide is made by polished cutting.

11. The light apparatus of claim 1, wherein the optical light guide is mixed with a coloring material for depressing a part of predetermined spectrum to adjust the color of the enlightened pattern.

12. The light apparatus of claim 1, wherein a fluorescent layer is applied on the optical light guide to change spectrum composition of the enlightened pattern.

13. The light apparatus of claim 1, wherein the LED plate has a second LED module for not directly emitting a second light into the optical light guide and for emitting the second light as a luminous source.

14. The light apparatus of claim 13, wherein the second LED module and the first LED module are controlled by the driver circuit independently to provide multiple operation combination of the first LED module and the second LED module.

15. The light apparatus of claim 1, wherein the optical light guide is made of Polycarbonate (PC) material and the enlightened pattern is formed with a laser light.

16. The light apparatus of claim 1, wherein the bulb shell has a thickness and the LED module emits a part of light transmitted in the bulb shell forming a second enlightened pattern.

17. The light apparatus of claim 1, wherein the bottom end of the optical light guide has concave lens for distributing the first light evenly into the optical light guide.

18. The light apparatus of claim 1, wherein the bottom end of the optical light guide has a convex lens for condensing the first light as a light beam into the optical light guide.

* * * * *